United States Patent [19]

Nakao et al.

[11] Patent Number: 5,934,355
[45] Date of Patent: Aug. 10, 1999

[54] METHOD OF MANUFACTURING METAL CERAMIC COMPOSITE MATERIAL

[75] Inventors: Yasuhiro Nakao; Kunitoshi Sugaya; Hiroto Shoji, all of Saitama, Japan

[73] Assignee: Honda Giken Kogyo Kabushiki Kaisha, Tokyo, Japan

[21] Appl. No.: 08/982,932

[22] Filed: Dec. 2, 1997

[30] Foreign Application Priority Data

Dec. 24, 1996 [JP] Japan ................................ 8-343080

[51] Int. Cl.$^6$ ........................... B22D 19/02; B22D 19/14
[52] U.S. Cl. ............................................. 164/97; 164/98
[58] Field of Search ....................... 164/97, 98; 427/431

[56] References Cited

U.S. PATENT DOCUMENTS

| | | |
|---|---|---|
| 5,394,930 | 3/1995 | Kennerknecht . |
| 5,669,434 | 9/1997 | Nakao et al. ............................ 164/97 |
| 5,786,035 | 7/1998 | Nakao et al. ......................... 427/443.2 |

FOREIGN PATENT DOCUMENTS

| | | |
|---|---|---|
| 0 368 781 | 5/1990 | European Pat. Off. . |
| 8-41563 | 7/1994 | Japan . |
| 2 294 272 | 4/1996 | United Kingdom . |

*Primary Examiner*—Kuang Y. Lin
*Attorney, Agent, or Firm*—Merchant, Gould, Smith, Edell, Welter & Schmidt

[57] ABSTRACT

A formed porous body of oxide ceramic and an aluminum alloy block are placed in a crucible in an atmospheric furnace, and a magnesium source is placed in another crucible in the atmospheric furnace. An argon gas is then introduced into the atmospheric furnace, which is then heated to produce a magnesium vapor from the magnesium source and melt the aluminum alloy block. Then, the argon gas is replaced with a nitrogen gas to generate magnesium nitride. The magnesium nitride reduces an oxide on surfaces of the formed porous body, exposing metal atoms on the surfaces of the formed porous body. The molten aluminum alloy permeates the formed porous body under a pressure lower or higher than the atmospheric pressure or alternate pressures lower and higher than the atmospheric pressure.

10 Claims, 3 Drawing Sheets

5,934,355

METHOD OF MANUFACTURING METAL CERAMIC COMPOSITE MATERIAL

BACKGROUND OF THE INVENTION

1. Field of the Invention

The present invention relates to a method of manufacturing a composite of metal and ceramic materials.

2. Description of the Prior Art

There have been known composites of ceramics in the form of oxides serving as a stiffener and metals as a matrix. One conventional process of manufacturing a metal-ceramic composite material as disclosed in Japanese laid-open patent publication No. 08-41563 reveals a technique of improving the wettability of an oxide ceramic body with respect to a metal matrix.

According to the disclosed process, an oxide ceramic material and magnesium are placed together into a furnace, and a rare gas atmosphere is developed in the furnace to sublime the magnesium. Then, a nitrogen gas is introduced into the furnace to generate magnesium nitride ($Mg_3N_2$). The surface of the oxide ceramic material is reduced by the generated magnesium nitride to expose metal on the surface, thus improving the wettability of the surface of the oxide ceramic material respect to a molten metal to be brought into contact with the oxide ceramic material for producing a composite of the oxide ceramic material and the metal.

The disclosed process is highly valuable to use because it can achieve strong bonding strength between oxide ceramic material and the metal due to the improved wettability. However, there has been a demand for a quicker process of manufacturing large-size metal-ceramic compound products as it will be time-consuming for a molten metal to permeate an oxide ceramic material in the production of such a large-size metal-ceramic compound product.

SUMMARY OF THE INVENTION

It is therefore an object of the present invention to provide a method of manufacturing a high-quality composite of metal and ceramic materials within a relatively short period of time.

According to the present invention, there is provided a method of manufacturing a composite of metal and ceramic materials, comprising the steps of permeating a formed porous body of oxide ceramic with a vapor of magnesium, introducing a nitrogen gas to generate magnesium nitride, reducing the oxide ceramic on surfaces of the formed porous body with the magnesium nitride to expose metal atoms on the surfaces of the formed porous body, and permeating the formed porous body with a molten metal under a pressure lower or higher than the atmospheric pressure or alternate pressures lower and higher than the atmospheric pressure.

When the formed porous body is permeated with the molten metal under the pressure lower than the atmospheric pressure, the permeation and diffusion of the magnesium nitride is activated to promote activation of the surfaces of the formed porous body, and the pressure of the gas remaining in the formed porous body is prevented from increasing, so that the permeation of the formed porous body with the molten metal is accelerated to produce a composite material within a relatively short period of time.

When the formed porous body is permeated with the molten metal under the pressure higher than the atmospheric pressure, the molten metal is forced to permeate the formed porous body to produce a composite material within a relatively short period of time.

When the formed porous body is permeated with the molten metal under the alternate pressures lower and higher than the atmospheric pressure, activation of the surfaces of the formed porous body is promoted and the molten metal is forced to permeate the formed porous body to produce a high-quality composite material within a relatively short period of time.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
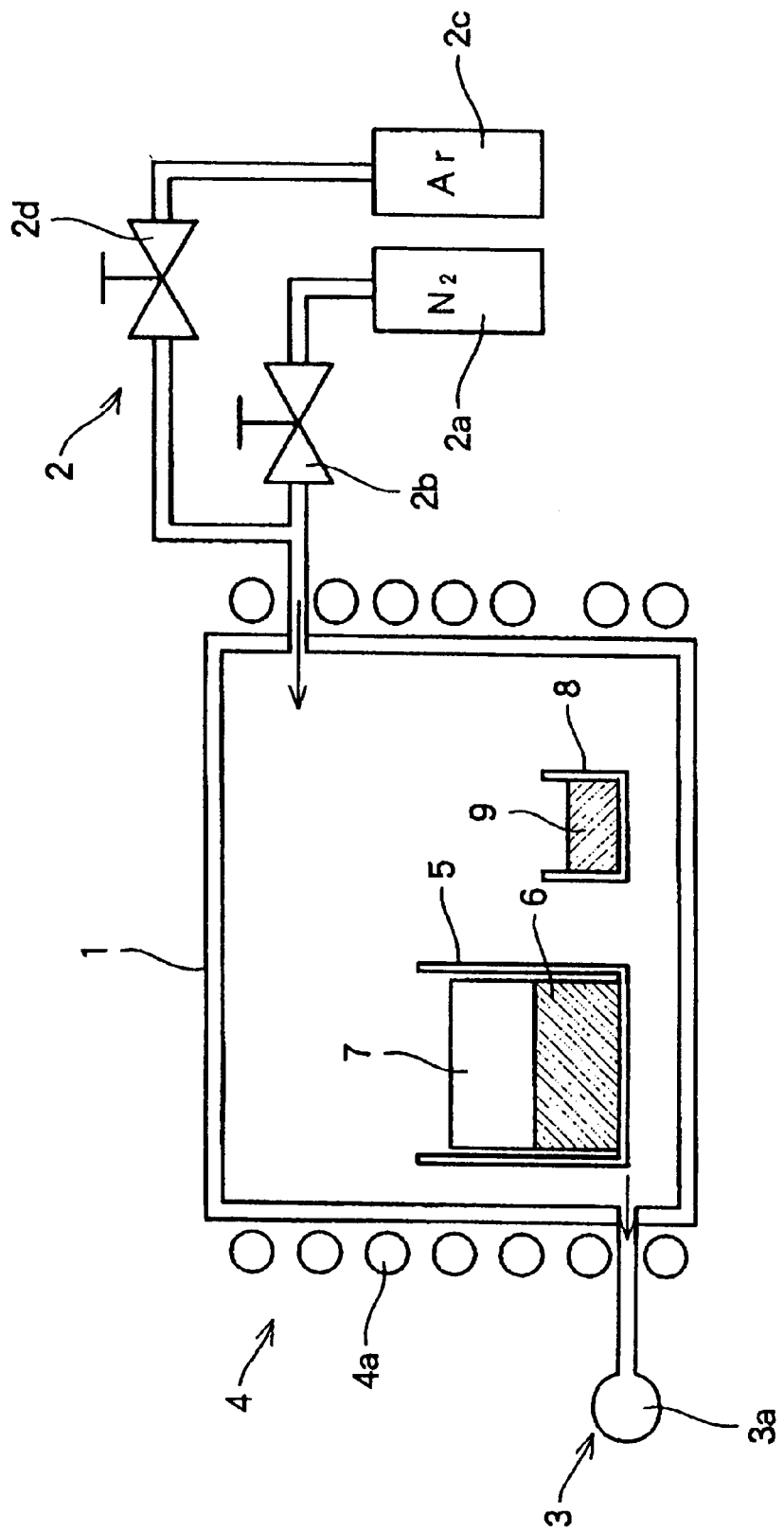
FIG. 1 is a schematic view of an apparatus for carrying out a method of manufacturing a composite of metal and ceramic materials according to the present invention.

As shown in FIG. 1, an apparatus for carrying out a method of manufacturing a composite of metal and ceramic materials according to the present invention generally comprises an atmospheric furnace 1, an atmospheric gas inlet system 2 for introducing an atmospheric gas into the atmospheric furnace 1, an evacuating unit 3 for evacuating the atmospheric furnace 1, and a heating unit 4 for heating the atmospheric furnace 1.

The atmospheric gas inlet system 2 has a nitrogen gas container 2a for supplying a nitrogen ($N_2$) gas, a nitrogen gas valve 2b connected to the nitrogen gas container 2a for controlling the flow of the nitrogen gas from the nitrogen gas container 2a, an argon gas container 2c for supplying an argon (Ar) gas, and an argon gas valve 2d connected to the argon gas container 2c for controlling the flow of the argon gas from the argon gas container 2c. The nitrogen gas valve 2b and the argon gas valve 2d are connected to the atmospheric furnace 1.

The evacuating unit 3 comprises a vacuum pump 3a connected to the atmospheric furnace 1.

The heating unit 4 comprises a heater 4a, which may be an electric heater, disposed around the atmospheric furnace 1, and a temperature regulator (not shown) connected to the heater 4a for controlling the temperature of the heater 4a.

The apparatus shown in FIG. 1 operates as follows:

A formed porous body 6 is placed in a crucible 5 in the atmospheric furnace 1, and then an aluminum alloy block 7 is placed in the crucible 5 over the formed porous body 6. A magnesium source 9 is placed in another crucible 8 in the atmospheric furnace 1. The magnesium source 9 may alternatively be placed in the crucible 5.

The formed porous body 6 is made of fibers or particles of alumina ($Al_2O_3$) having a volume content (Vf) of about 20%. The magnesium source 9 is made of pure magnesium (Mg), a magnesium alloy, an aluminum-magnesium alloy, or the like.

An argon (Ar) gas is introduced from the argon gas container 2c through the argon gas valve 2d into the atmospheric furnace 1, which is then heated by the heating unit 4. The magnesium is sublimed from the magnesium source 9, and the magnesium vapor permeates and is diffused into the formed porous body 6.

At this time, the aluminum alloy block 7 is turned into a molten aluminum alloy. Since the wettability of the formed porous body 6 with respect to the molten aluminum alloy is low and the magnesium vapor is diffused in the formed porous body 6, the formed porous body 6 floats on the molten aluminum alloy.

Then, a nitrogen ($N_2$) gas is introduced from the nitrogen gas container 2a through the nitrogen gas valve 2b into the atmospheric furnace 1. The sublimed magnesium and the supplied nitrogen gas react with each other, producing magnesium nitride ($Mg_3N_2$). The magnesium nitride is brought into contact with the alumina of the fibers or particles of the formed porous body 6, causing a reducing reaction which deprives the alumina of oxygen and exposing aluminum atoms (Al) in the interstices of the formed porous body 6.

The exposed aluminum atoms are highly active and improve the wettability of the formed porous body 6 with respect to the molten aluminum alloy. Therefore, the molten aluminum alloy permeates the formed porous body 6, producing a metal-ceramic composite material.

According to the present invention, the molten aluminum alloy permeates the formed porous body 6 with increased efficiency under pressures lower than the atmospheric pressure, or pressures higher than the atmospheric pressure, or alternate pressures lower and higher than the atmospheric pressure.

Examples of the manufacturing process according to the present invention will be described below.

EXAMPLE 1

Figure 2:
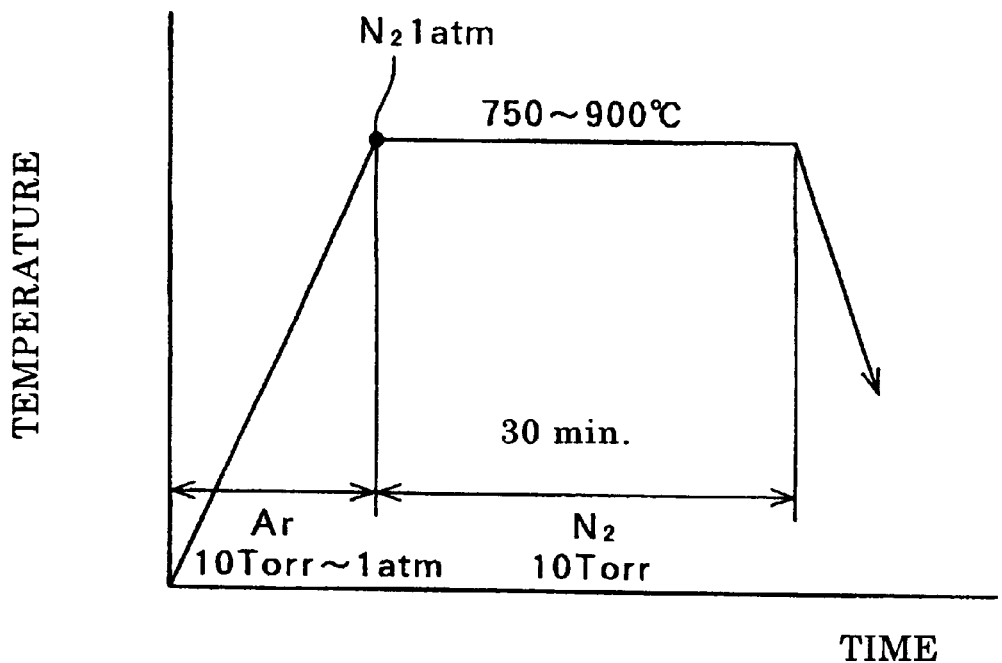
FIG. 2 is a graph showing a heating temperature pattern in relation to a permeation time at the time a molten metal permeates an oxide ceramic material under pressures lower than the atmospheric pressure.

In Example 1, the molten aluminum alloy permeated the formed porous body 6 under pressures lower than the atmospheric pressure according to a temperature pattern as shown in FIG. 2.

Specifically, the atmospheric furnace 1 was evacuated by the evacuating unit 3, and thereafter an argon (Ar) gas was introduced from the argon gas container 2c through the argon gas valve 2d into the atmospheric furnace 1 until the pressure in the atmospheric furnace 1 increased back to the atmospheric pressure.

Then, the atmospheric furnace 1 was heated by the heating unit 4 to a certain temperature within a temperature range from 75° C. to 900° C. thereby to promote sublimation of magnesium from the magnesium source 9. It was effective to lower the pressure in the atmospheric furnace 1 to a level within a pressure range from 10 Torr to 1 atm with the vacuum pump 3a for activating the sublimation of magnesium from the magnesium source 9.

If the temperature in the atmospheric furnace 1 reaches the melting point (liquidus) of the aluminum alloy, the aluminum alloy block 7 is melted. However, no composite material is formed because the wettability of the formed porous body 6 with respect to the molten aluminum alloy is poor.

Then, a nitrogen ($N_2$) gas was introduced from the nitrogen gas container 2a through the nitrogen gas valve 2b into the atmospheric furnace 1, replacing the atmosphere in the atmospheric furnace 1 with the nitrogen gas. The nitrogen gas reacts with the sublimed magnesium in the atmospheric furnace 1, producing magnesium nitride ($Mg_3N_2$). The magnesium nitride reduced the alumina of the surfaces of the fibers or particles of the formed porous body 6, exposing aluminum atoms (Al) in the interstices of the formed porous body 6.

Thereafter, the atmospheric furnace 1 was evacuated by the vacuum pump 3a to a pressure of about 10 Torr. The molten aluminum alloy permeated the formed porous body 6, producing a composite material product.

After elapse of about 30 minutes, the atmospheric furnace 1 was quickly cooled down to 200° C. Then, the composite material product was removed from the atmospheric furnace 1, and inspected. The results of the inspection indicated that the composite material product was filled up with the aluminum alloy, and the percentage of the volume of the formed porous body 6 which was permeated by the aluminum alloy was about 100%.

EXAMPLE 2

Figure 3:
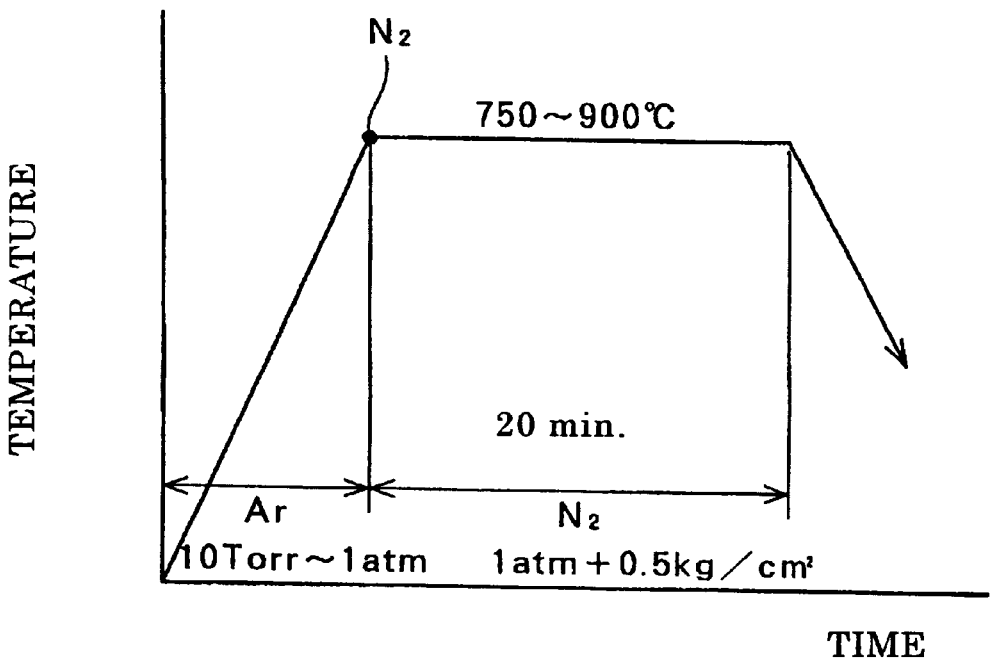
FIG. 3 is a graph showing a heating temperature pattern in relation to a permeation time at the time a molten metal permeates an oxide ceramic material under pressures higher than the atmospheric pressure.

In Example 2, the molten aluminum alloy permeated the formed porous body 6 under pressures higher than the atmospheric pressure according to a temperature pattern as shown in FIG. 3.

In Example 2, the same process as with Example 1 was carried out until the magnesium nitride reduced the alumina of the surfaces of the fibers or particles of the formed porous body 6, exposing aluminum atoms (Al) in the interstices of the formed porous body 6. Thereafter, a nitrogen ($N_2$) gas was further introduced from the nitrogen gas container 2a through the nitrogen gas valve 2b into the atmospheric furnace 1, increasing the pressure in the atmospheric furnace 1 up to a level equal to the sum of the atmospheric pressure (1 atm) and 0.5 kg/cm$^2$. Subsequent experimentation showed that the pressure to be added to the atmospheric pressure may range from 0.1 kg/cm$^2$ to 1 kg/cm$^2$ to obtain desired results.

After elapse of about 20 minutes, the atmospheric furnace 1 was quickly cooled down to 200° C. Then, the composite material product was removed from the atmospheric furnace 1, and inspected. The results of the inspection indicated that the composite material product was filled up with the aluminum alloy, and the percentage of the volume of the formed porous body 6 which was permeated by the aluminum alloy was about 100%.

EXAMPLE 3

Figure 4:
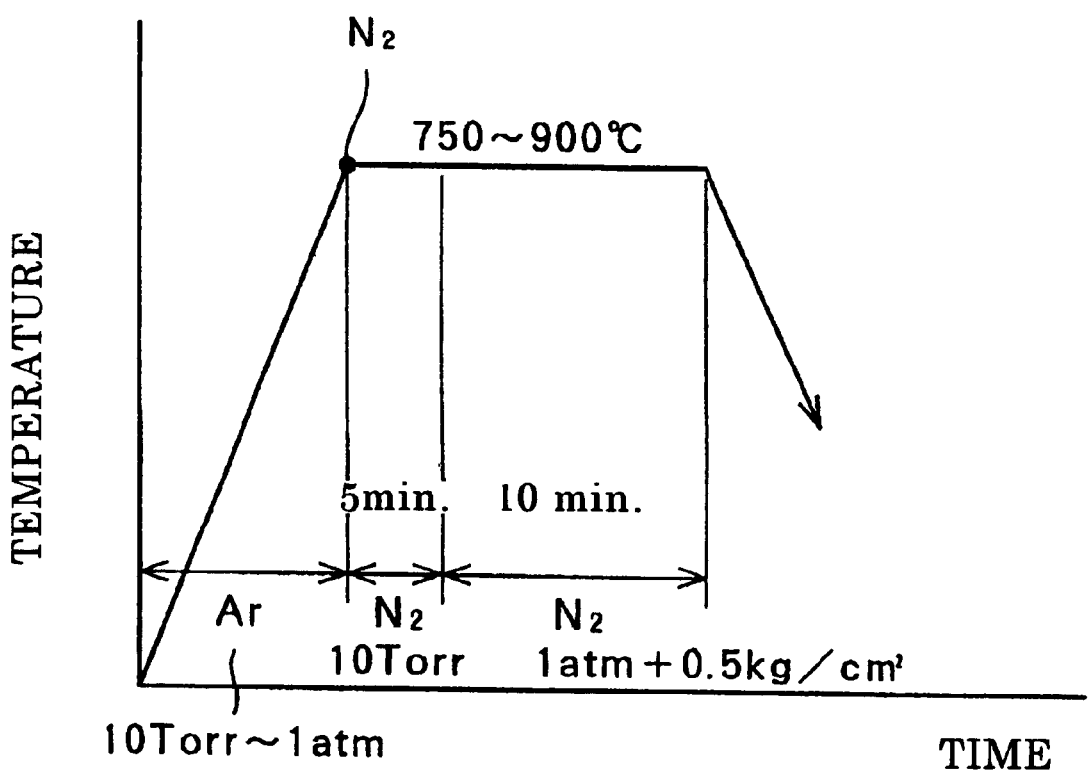
FIG. 4 is a graph showing a heating temperature pattern in relation to a permeation time at the time a molten metal permeates an oxide ceramic material under alternate Pressures lower and higher than the atmospheric pressure.

In Example 3, the molten aluminum alloy permeated the formed porous body 6 under alternate pressures lower and higher than the atmospheric pressure according to a temperature pattern as shown in FIG. 4.

In Example 3, the same process as with Examples 1 and 2 was carried out until the magnesium nitride reduced the alumina of the surfaces of the fibers or particles of the formed porous body 6, exposing aluminum atoms (Al) in the interstices of the formed porous body 6. Thereafter, the atmospheric furnace 1 was evacuated by the vacuum pump 3a to a pressure of about 10 Torr, and the reduced pressure was maintained in the atmospheric furnace 1 for 5 minutes. Then, a nitrogen ($N_2$) gas was introduced from the nitrogen gas container 2a through the nitrogen gas valve 2b into the atmospheric furnace 1, increasing the pressure in the atmospheric furnace 1 up to a level equal to the sum of the atmospheric pressure (1 atm) and 0.5 kg/cm². The increased pressure was maintained in the atmospheric furnace 1 for 10 minutes.

Subsequently, the atmospheric furnace 1 was quickly cooled down to 200° C. Then, the composite material product was removed from the atmospheric furnace 1, and inspected. The results of the inspection indicated that the composite material product was filled up with the aluminum alloy, and the percentage of the volume of the formed porous body 6 which was permeated by the aluminum alloy was about 100%.

The table shown below various percentages (composite ratios) of porous body volumes permeated by the aluminum alloy under various pressures including those of Examples 1 through 3 for different permeation times at a permeation temperature of 900° C.

Permeation times vs. composite ratios (%)
Permeation temperature: 900° C.

|  | Permeation times (min.) | | | | | |
| --- | --- | --- | --- | --- | --- | --- |
|  | 10 | 15 | 20 | 30 | 45 | 60 |
| 1 atm | 5 | 10 | 30 | 50 | 85 | 100 |
| 10 Torr | 30 | 60 | 90 | 100 | 100 | 100 |
| 1 atm + 0.5 kg/cm² | 60 | 90 | 100 | 100 | 100 | 100 |
| 10 Torr – atm + 0.5 kg/cm² | 80 | 100 | 100 | 100 | 100 | 100 |

A study of the above table indicates that controlling the pressure in the furnace while the aluminum alloy is permeating the formed porous body not only contributes to an increase in the quality of the composite material product, but also is effective to increase the productivity, as compared with the permeation of the formed porous body with the aluminum alloy under the atmospheric pressure. It is also found out that pressures lower than the atmospheric pressure are more effective than the atmospheric pressure, pressures lower than the atmospheric pressure are more effective than pressures higher than the atmospheric pressure, and alternative pressures lower and higher than the atmospheric pressure are more effective than pressures higher than the atmospheric pressure.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. A method of manufacturing a composite of metal and ceramic materials, comprising the steps of:

permeating a formed porous body of oxide ceramic with a vapor of magnesium;

introducing a nitrogen gas to generate magnesium nitride;

reducing the oxide ceramic on surfaces of said formed porous body with the magnesium nitride to expose metal atoms on the surfaces of the formed porous body; and permeating said formed porous body with a molten metal under a pressure different from the atmospheric pressure.

2. A method according to claim 1, wherein said pressure is lower than said atmospheric pressure.

3. A method according to claim 2, wherein said pressure is of about 10 Torr.

4. A method according to claim 1, wherein said pressure is higher than said atmospheric pressure.

5. A method according to claim 4, wherein said pressure is higher than said atmospheric pressure by a pressure range from 0.1 to 1 kg/cm².

6. A method according to claim 4, wherein said pressure is higher than said atmospheric pressure by 0.5 kg/cm².

7. A method of manufacturing a composite of metal and ceramic materials, comprising the steps of:

permeating a formed porous body of oxide ceramic with a vapor of magnesium;

introducing a nitrogen gas to generate magnesium nitride;

reducing the oxide ceramic on surfaces of said formed porous body with the magnesium nitride to expose metal atoms on the surfaces of the formed porous body; and permeating said formed porous body with a molten metal under alternate pressures lower and higher than the atmospheric pressure.

8. A method according to claim 7, wherein one of said alternate pressures is of about 10 Torr.

9. A method according to claim 7, wherein one of said alternate pressures is equal to the sum of the atmospheric pressure and a pressure range from 0.1 to 1 kg/cm².

10. A method according to claim 7, wherein one of said alternate pressures is equal to the sum of the atmospheric pressure and 0.5 kg/cm².

* * * * *